United States Patent
Zhou et al.

(10) Patent No.: US 12,341,720 B2
(45) Date of Patent: *Jun. 24, 2025

(54) CROSS CARRIER ACTIVATION OF A PERIODIC GRANT

(71) Applicant: QUALCOMM Incorporated, San Diego, CA (US)

(72) Inventors: Yan Zhou, San Diego, CA (US); Tao Luo, San Diego, CA (US); Xiaoxia Zhang, San Diego, CA (US); Konstantinos Dimou, New York City, NY (US); Hamed Pezeshki, San Diego, CA (US); Kazuki Takeda, Minato-ku (JP); Sony Akkarakaran, Poway, CA (US); Seyed Ali Akbar Fakoorian, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,955

(22) Filed: Mar. 1, 2024

(65) Prior Publication Data

US 2024/0260047 A1 Aug. 1, 2024

Related U.S. Application Data

(63) Continuation of application No. 17/656,360, filed on Mar. 24, 2022, now Pat. No. 11,991,717, which is a
(Continued)

(51) Int. Cl.
*H04L 5/00* (2006.01)
*H04W 72/0453* (2023.01)
*H04W 72/23* (2023.01)

(52) U.S. Cl.
CPC ....... *H04L 5/0048* (2013.01); *H04W 72/0453* (2013.01); *H04W 72/23* (2023.01)

(58) Field of Classification Search
CPC ............. H42W 72/0453; H42W 72/23; H42W 72/231; H42W 72/232; H04L 5/001; H04L 5/0053; H04L 5/0094
See application file for complete search history.

(56) References Cited

U.S. PATENT DOCUMENTS

| 9,008,014 B2 | 4/2015 | Choi et al. |
| 10,932,233 B2 | 2/2021 | Kim et al. |

(Continued)

FOREIGN PATENT DOCUMENTS

| CN | 102823310 A | 12/2012 |
| CN | 107079447 A | 8/2017 |

(Continued)

OTHER PUBLICATIONS

International Search Report and Written Opinion—PCT/US2020/039081—ISA/EPO—Aug. 28, 2020.

(Continued)

*Primary Examiner* — Kevin C. Harper
(74) *Attorney, Agent, or Firm* — Norton Rose Fulbright US LLP

(57) ABSTRACT

In one aspect, a method of wireless communication includes receiving, by a mobile communication device during a first cycle, a periodic grant via a first carrier of a plurality of carriers, monitoring, by the mobile communication device during a next cycle after the first cycle, for configured grants (CGs) for multiple carriers of the plurality of carriers based on the periodic grant, and receiving, by the mobile communication device during the next cycle after the first cycle, a first transmission in a first CG of the CGs via a second carrier of the plurality of carriers and a second transmission (Continued)

in a second CG of the CGs via a third carrier of the plurality of carriers. Other aspects and features are also claimed and described.

13 Claims, 11 Drawing Sheets

Related U.S. Application Data continuation of application No. 16/908,318, filed on Jun. 22, 2020, now Pat. No. 11,356,996.

(60) Provisional application No. 62/871,122, filed on Jul. 6, 2019.

(56) References Cited

U.S. PATENT DOCUMENTS

| | | | |
|---|---|---|---|
| 11,356,996 B2* | 6/2022 | Zhou | H04L 5/0055 |
| 2012/0087318 A1 | 4/2012 | Liu et al. | |
| 2012/0113941 A1 | 5/2012 | Chung et al. | |
| 2012/0294272 A1 | 11/2012 | Han et al. | |
| 2013/0010721 A1 | 1/2013 | Aiba et al. | |
| 2013/0058291 A1 | 3/2013 | Ahn et al. | |
| 2013/0201964 A1 | 8/2013 | Kim et al. | |
| 2013/0301600 A1 | 11/2013 | Park | |
| 2014/0119253 A1 | 5/2014 | Weng et al. | |
| 2016/0020875 A1 | 1/2016 | Seo et al. | |
| 2016/0323076 A1 | 11/2016 | Takeda et al. | |
| 2018/0054808 A1 | 2/2018 | Pan et al. | |
| 2018/0270851 A1 | 9/2018 | Bhattad et al. | |
| 2020/0128557 A1 | 4/2020 | Suzuki et al. | |
| 2020/0145998 A1 | 5/2020 | Sun et al. | |
| 2021/0044388 A1 | 2/2021 | Cao | |
| 2022/0217688 A1 | 7/2022 | Zhou et al. | |

FOREIGN PATENT DOCUMENTS

| | | |
|---|---|---|
| WO | WO-2018030766 A1 | 2/2018 |
| WO | WO-2018171927 A1 | 9/2018 |
| WO | WO-2019028890 A1 | 2/2019 |

OTHER PUBLICATIONS

Panasonic: "Scheduling Aspects for Carrier Aggregation", 3GPP Draft, R2-100231, Scheduling Aspects CC, 3rd Generation Partnership Project (3GPP), Mobile Competence Centre, 650, Route Des Lucioles, F-06921 Sophia-Antipolis Cedex, France, vol. RAN WG2, No. Valencia, Spain, Jan. 18, 2010, Jan. 12, 2010 (Jan. 12, 2010), XP050420984, 3 pages, [retrieved on Jan. 12, 2010] section 2.1.

* cited by examiner

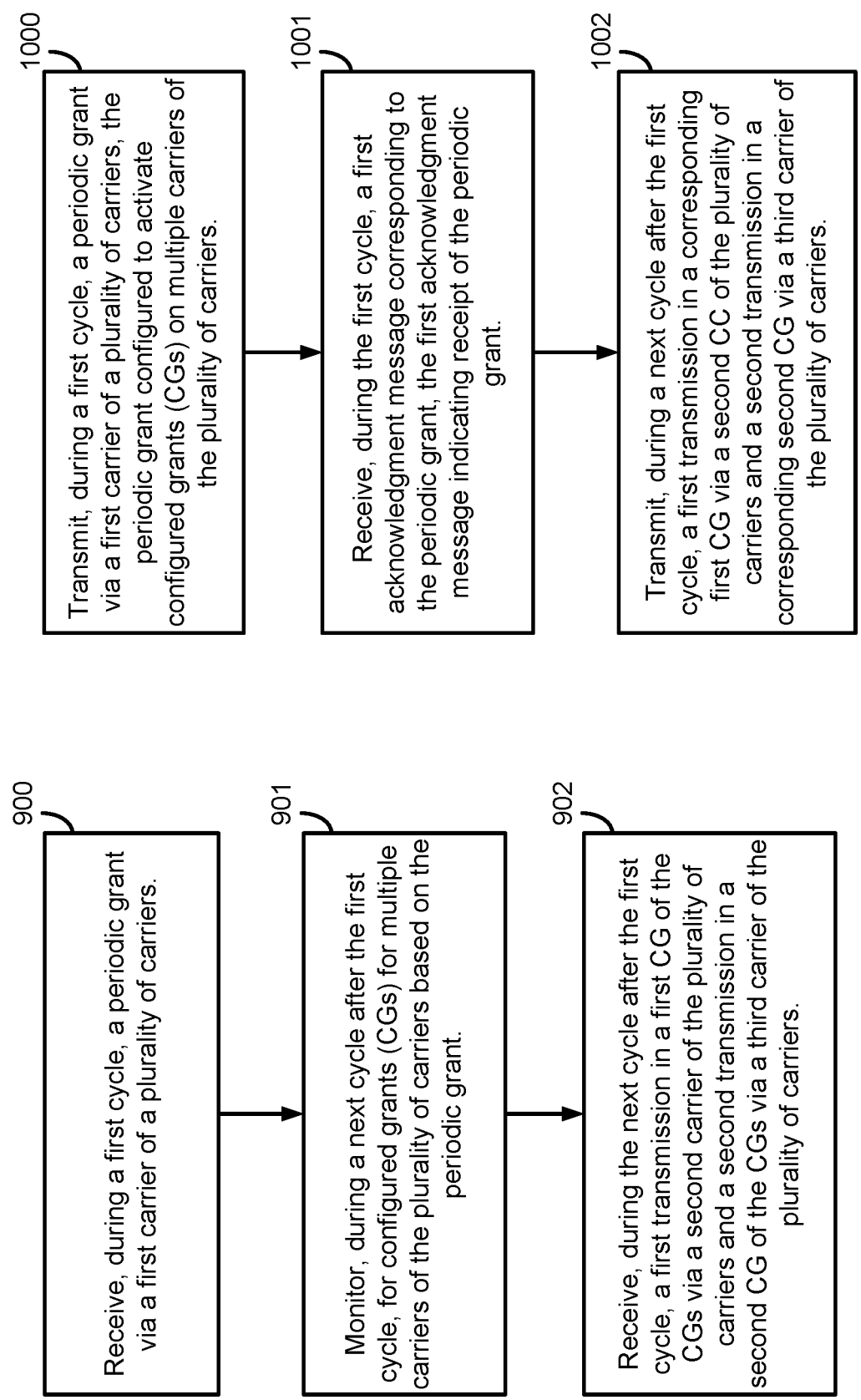

CROSS CARRIER ACTIVATION OF A PERIODIC GRANT

CROSS-REFERENCE TO RELATED APPLICATIONS

This application is a continuation of U.S. patent application Ser. No. 17/656,360, entitled, "CROSS CARRIER ACTIVATION OF A PERIODIC GRANT," filed Mar. 24, 2022, and is a continuation of U.S. patent application Ser. No. 16/908,318, entitled, "CROSS CARRIER ACTIVATION OF A PERIODIC GRANT," filed Jun. 22, 2020, and also claims the benefit of a U.S. Provisional Patent Application No. 62/871,122, entitled, "CROSS CARRIER ACTIVATION OF A PERIODIC GRANT," filed on Jul. 6, 2019, both of which are expressly incorporated by reference herein in their entirety.

TECHNICAL FIELD

Aspects of the present disclosure relate generally to wireless communication systems, and more particularly, to cross carrier activation of a periodic grant Certain embodiments of the technology discussed below can enable and provide cross carrier activation of a periodic grant by a single message.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, by a mobile communication device during a first cycle, a periodic grant via a first carrier of a plurality of carriers, monitoring, by the mobile communication device during a next cycle after the first cycle, for configured grants (CGs) for multiple carriers of the plurality of carriers based on the periodic grant, and receiving, by the mobile communication device during the next cycle after the first cycle, a first transmission in a first CG of the CGs via a second carrier of the plurality of carriers and a second transmission in a second CG of the CGs via a third carrier of the plurality of carriers.

In an additional aspect of the disclosure, a method of wireless communication includes transmitting, by a mobile communication device during a first cycle, a periodic grant via a first carrier of a plurality of carriers, the periodic grant configured to activate configured grants (CGs) on multiple carriers of the plurality of carriers, receiving, by the mobile communication device during the first cycle, a first acknowledgment message corresponding to the periodic grant, the first acknowledgment message indicating receipt of the periodic grant; and transmitting, by the mobile communication device during a next cycle after the first cycle, a first transmission in a corresponding first CG via a second CC of the plurality of carriers and a second transmission in a corresponding second CG via a third carrier of the plurality of carriers.

In an additional aspect of the disclosure, an apparatus configured for wireless communication is disclosed. The apparatus includes means for receiving, by a mobile communication device during a first cycle, a periodic grant via a first carrier of a plurality of carriers, means for monitoring, by the mobile communication device during a next cycle after the first cycle, for configured grants (CGs) for multiple carriers of the plurality of carriers based on the periodic grant, and means for receiving, by the mobile communication device during the next cycle after the first cycle, a first transmission in a first CG of the CGs via a second carrier of the plurality of carriers and a second transmission in a second CG of the CGs via a third carrier of the plurality of carriers.

In an additional aspect of the disclosure, an apparatus configured for wireless communication is disclosed. The apparatus includes means for transmitting, by a mobile communication device during a first cycle, a periodic grant via a first carrier of a plurality of carriers, the periodic grant configured to activate configured grants (CGs) on multiple carriers of the plurality of carriers, means for receiving, by the mobile communication device during the first cycle, a first acknowledgment message corresponding to the periodic grant, the first acknowledgment message indicating receipt of the periodic grant; and means for transmitting, by the mobile communication device during a next cycle after the first cycle, a first transmission in a corresponding first CG via a second CC of the plurality of carriers and a second transmission in a corresponding second CG via a third carrier of the plurality of carriers.

In an additional aspect of the disclosure, a non-transitory computer-readable medium having program code recorded thereon. The program code further includes code to receive, by a mobile communication device during a first cycle, a periodic grant via a first carrier of a plurality of carriers, monitor, by the mobile communication device during a next cycle after the first cycle, for configured grants (CGs) for multiple carriers of the plurality of carriers based on the periodic grant, and receive, by the mobile communication device during the next cycle after the first cycle, a first transmission in a first CG of the CGs via a second carrier of the plurality of carriers and a second transmission in a second CG of the CGs via a third carrier of the plurality of carriers.

In an additional aspect of the disclosure, a non-transitory computer-readable medium having program code recorded thereon. The program code further includes code to transmit, by a mobile communication device during a first cycle, a periodic grant via a first carrier of a plurality of carriers, the periodic grant configured to activate configured grants (CGs) on multiple carriers of the plurality of carriers, receive, by the mobile communication device during the first cycle, a first acknowledgment message corresponding to the periodic grant, the first acknowledgment message indicating receipt of the periodic grant; and transmit, by the mobile communication device during a next cycle after the first cycle, a first transmission in a corresponding first CG via a second CC of the plurality of carriers and a second transmission in a corresponding second CG via a third carrier of the plurality of carriers.

In an additional aspect of the disclosure, an apparatus configured for wireless communication is disclosed. The apparatus includes at least one processor, and a memory coupled to the processor. The processor is configured to receive, by a mobile communication device during a first cycle, a periodic grant via a first carrier of a plurality of carriers, monitor, by the mobile communication device during a next cycle after the first cycle, for configured grants (CGs) for multiple carriers of the plurality of carriers based on the periodic grant, and receive, by the mobile communication device during the next cycle after the first cycle, a first transmission in a first CG of the CGs via a second carrier of the plurality of carriers and a second transmission in a second CG of the CGs via a third carrier of the plurality of carriers.

In an additional aspect of the disclosure, an apparatus configured for wireless communication is disclosed. The apparatus includes at least one processor, and a memory coupled to the processor. The processor is configured to transmit, by a mobile communication device during a first cycle, a periodic grant via a first carrier of a plurality of carriers, the periodic grant configured to activate configured grants (CGs) on multiple carriers of the plurality of carriers, receive, by the mobile communication device during the first cycle, a first acknowledgment message corresponding to the periodic grant, the first acknowledgment message indicating receipt of the periodic grant; and transmit, by the mobile communication device during a next cycle after the first cycle, a first transmission in a corresponding first CG via a second CC of the plurality of carriers and a second transmission in a corresponding second CG via a third carrier of the plurality of carriers.

In another aspect of the disclosure, a method of wireless communication includes receiving, by a user equipment (UE) during a first cycle, SPS message (e.g., DCI during a first Physical Downlink Control Channel (PDCCH)) via a first component carrier (CC) of a plurality of CCs, monitoring, by the UE during a next cycle after the first cycle, for configured grants (CGs) of Physical Downlink Shared Channels (PDSCHs) for each CC of the plurality of CC based on the SPS message, and receiving, by the UE during the next cycle after the first cycle, a first PDSCH transmission in a corresponding first PDSCH via a second CC of the plurality of CCs and a second PDSCH transmission in a corresponding second PDSCH via a third CC of the plurality of CCs.

In another aspect of the disclosure, a method of wireless communication includes transmitting, by a base station during a first cycle, one or more SPS messages, the one or more SPS messages including a first SPS message transmitted via a first component carrier (CC) of a plurality of CCs, the first SPS message configured to activate configured grants (CGs) of Physical Downlink Shared Channels (PDSCHs) on multiple CCs of the plurality of CCs, receiving, by the base station during the first cycle, a first acknowledgment message corresponding to the first SPS message, the first acknowledgment message indicating receipt of the first SPS message, and transmitting, by the base station during a next cycle after the first cycle, a first PDSCH transmission in a corresponding first PDSCH via a second CC of the plurality of CCs and a second PDSCH transmission in a corresponding second PDSCH via a third CC of the plurality of CCs.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 9 is a block diagram illustrating example blocks executed by a UE configured according to an aspect of the present disclosure.

FIG. 10 is a block diagram illustrating example blocks executed by a UE configured according to an aspect of the present disclosure.

DETAILED DESCRIPTION

Figure 1:
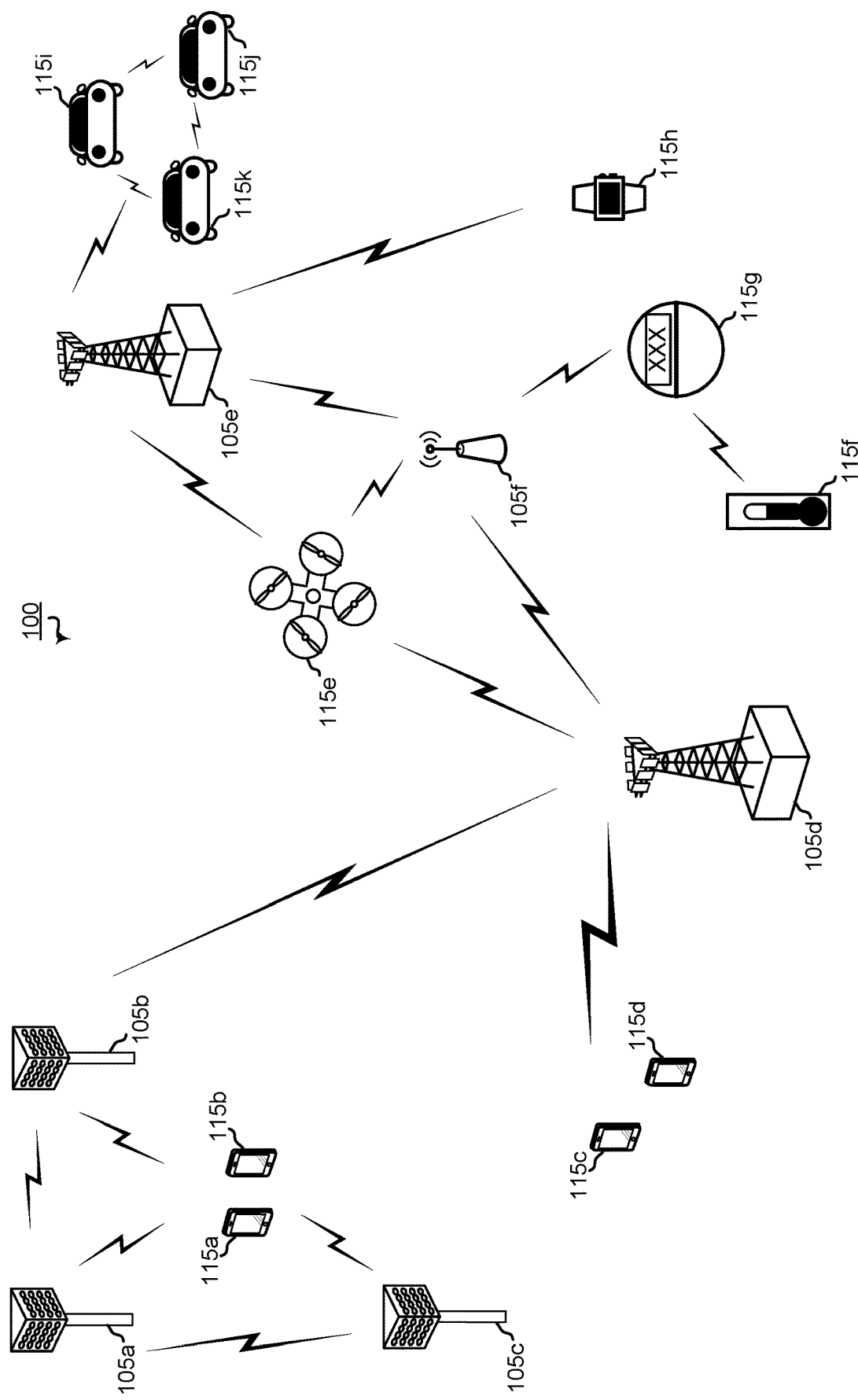
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/see), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
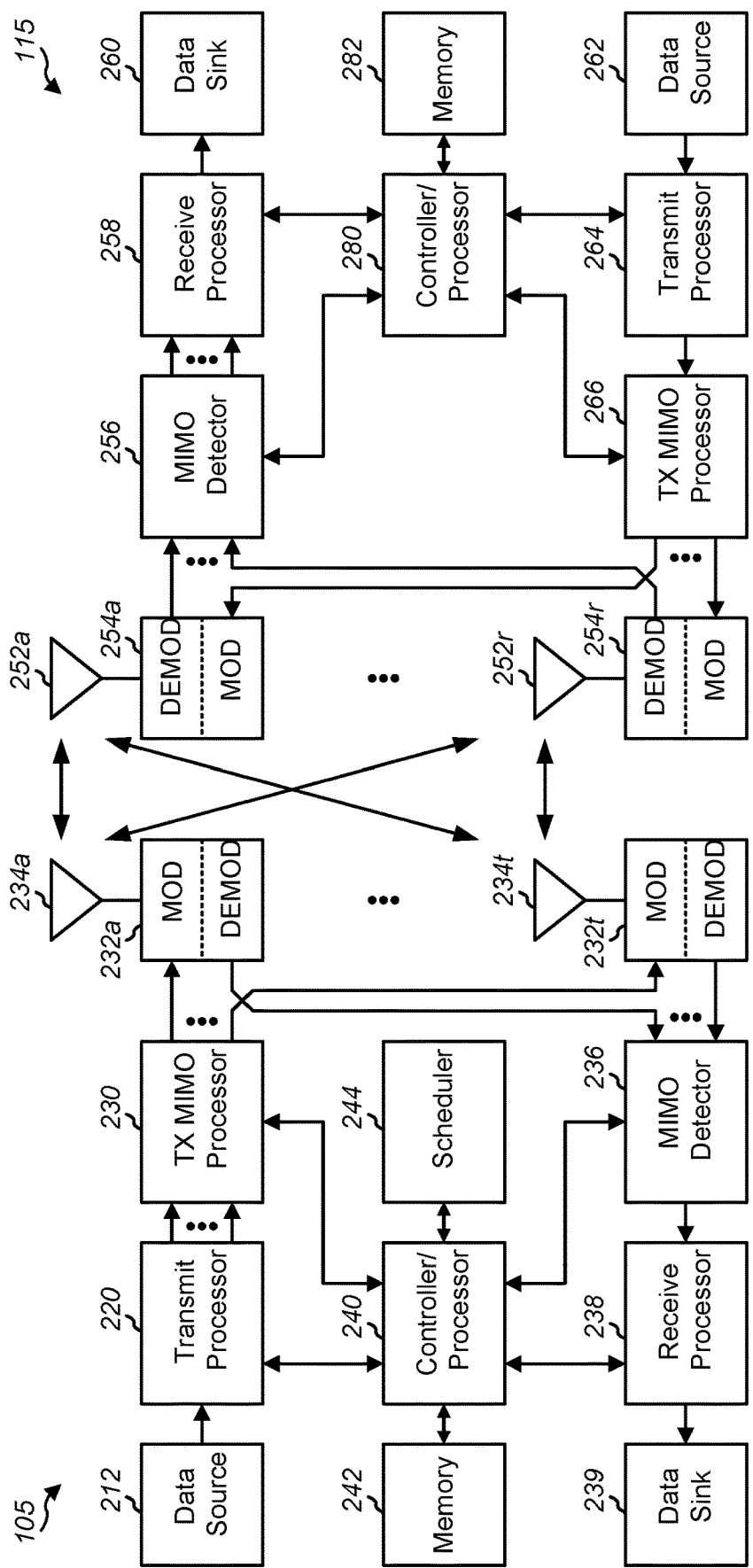
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples.

Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 9 and 10, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
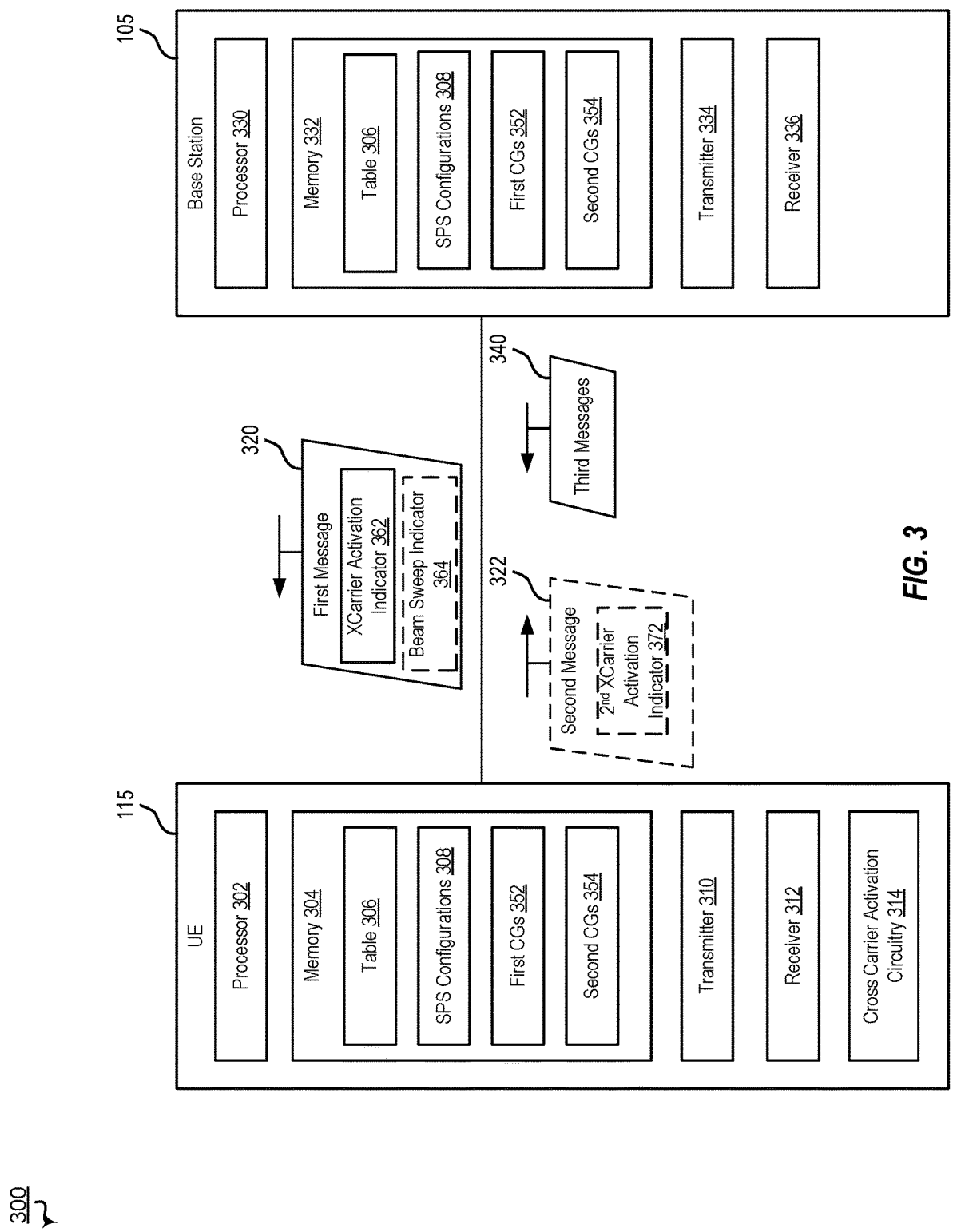
FIG. 3 is a block diagram illustrating an example of a wireless communications system that enables cross carrier activation of a periodic grant in accordance with aspects of the present disclosure.

FIG. 3 illustrates an example of a wireless communications system 300 that supports single message cross carrier activation or reactivation in accordance with aspects of the present disclosure. To illustrate, a single periodic grant, such as downlink control message (e.g., downlink control information (DCI) message) or semi-persistent scheduling (SPS) message, on one carrier (e.g., channel or component carrier (CC)) can activate or reactivate periodic grant (e.g., SPS scheduling) on multiple channels or CCs. That is configured grants (CGs) may be scheduled for multiple types of transmissions for multiple CCs. For example, CGs for PDSCHs can be scheduled for multiple CCs for one or more subsequent cycles based on the single message indicating a periodic grant.

In some examples, wireless communications system 300 may implement aspects of wireless communication system 100. For example, wireless communications system 300 may include UE 115 and base station 105. Although one UE and one base station are illustrated, in other implementations, wireless communications system 300 may include multiple UEs 115, multiple base stations 105, or both. Single message cross carrier may enable reduced overhead and latency when scheduling messages and thus may increase throughput. Cross carrier repetition may further be utilized to increase reliability, and possibly throughput when interference or blockage is present on or more carriers (e.g., channels or CCs).

UE 115 includes processor 302, memory 304, transmitter 310, receiver 312, and channel measurement circuitry 314. Processor 302 may be configured to execute instructions stored at memory 304 to perform the operations described herein. In some implementations, processor 302 includes or corresponds to controller/processor 280, and memory 304 includes or corresponds to memory 282. Memory 304 may also be configured to store a table 306, SPS configurations 308, first CGs 352, second CGs 354, or a combination thereof, as further described herein.

The table 306 may include or correspond to a table (e.g., a mapping table) to which indicates one or more SPS configurations 308 based on a cross carrier activation indicator, such as cross carrier activation indicator 362. Each SPS configuration of the one or more SPS configurations 308 includes scheduling information and/or transmission information for scheduling CGs, such as first CGs 352, second CGs 354, or both. To illustrate, the scheduling information may include when and where the CGs are located in a next cycle. As another illustration, the transmission information may include the transmission and/or reception characteristics for transmitting/receiving the CGs, such as BWP ID, beam sweep enabled, beam sweep pattern, etc.

Transmitter 310 is configured to transmit data to one or more other devices, and receiver 312 is configured to receive data from one or more other devices. For example, transmitter 310 may transmit data, and receiver 312 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 310 and receiver 312 may be replaced with a transceiver. Additionally, or alternatively, transmitter 310, receiver, 312, or both may include or correspond to one or more components of UE 115 described with reference to FIG. 2.

Cross carrier activation circuitry 314 is configured to perform one or more cross carrier operations described herein, such as control activation or reactivation of SPS CGs, generation of CGs (e.g., 352, 354), processing of cross carrier activation indicators (e.g., 362), generating second cross carrier activation indicators (e.g., 372), or a combination thereof. A second cross carrier activation indicator (e.g., 372) may acknowledge receipt and successful decode of a cross carrier activation indicator (e.g., 362). Although illustrated as separate from processor 302, transmitter 310, and receiver 312, cross carrier activation circuitry 314 may include or correspond to such components.

Base station 105 includes processor 330, memory 332, transmitter 334, and receiver 336. Processor 330 may be configured to execute instructions stores at memory 332 to perform the operations described herein. In some implementations, processor 330 includes or corresponds to controller/processor 240, and memory 332 includes or corresponds to memory 242. Memory 332 may be configured to store a table 306, SPS configurations 308, first CGs 352, second CGs 354, or a combination thereof, similar to the UE 115 and as further described herein.

Transmitter 334 is configured to transmit data to one or more other devices, and receiver 336 is configured to receive data from one or more other devices. For example, transmitter 334 may transmit data, and receiver 336 may receive data, via a network, such as a wired network, a wireless network, or a combination thereof. For example, base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 334 and receiver 336 may be replaced with a transceiver. Additionally, or alternatively, transmitter 334, receiver, 336, or both may include or correspond to one or more components of base station 105 described with reference to FIG. 2.

During operation of wireless communications system 300, a first message 320 is transmitted by the base station 105 via a first carrier (e.g., a first channel or a first component carrier (CC)) of a plurality of carriers. As illustrated in FIG. 1, the first message 320 includes a cross carrier activation indicator 362. Cross carrier activation indicator 362 may indicate activation or reactivation of a periodic grant, such as an SPS. Alternatively, the first message 320 may indicate activation or reactivation of a periodic grant, such as an SPS. To illustrated, the first message 320, such as DCI, may be an SPS activation message or an SPS reactivation message. Based on the cross carrier activation indicator 362 of the first message 320, the UE 115 initiates scheduling of one or more CGs for multiple channels or CCs. For example, the UE 115 (e.g., 314 thereof) determines a particular SPS configuration of the SPS configurations 308 based on table 306. To illustrate, the cross carrier activation indicator 362 may be a single bit or bitmap (multiple bits), and the UE 115 may determine the SPS configuration by using table 306.

The UE 115 schedules first CGs 352, second CGs 354 based on the determined SPS configuration indicated by the cross carrier activation indicator 362 directly (e.g., information on schedule and transmission is included the message) or indirectly (e.g., settings are identified by the cross carrier activation indicator 362 using table 306). The CGs may correspond to any type of transmission. As illustrated in FIG. 3, the CG scheduled is for a downlink transmission, such as PDSCH. Based on scheduling the CGs, the UE monitors the scheduling CGs for reception of transmissions.

In some implementations, the first message 320 further includes a beam sweep indicator 364. The beam sweep indicator 364 may indicate that beam sweep is enabled, a particular beam sweep pattern for the CGs, or both. In a particular implementation, a single bit or field of the first message 320 indicates both cross carrier activation and beam sweep, i.e., functions as both 362 and 364. In other implementations, the beam sweep indicator 364 is included in another message (e.g., another message similar to first message 320) transmitted on a second carrier. The other message then enables beam sweep for the CGs scheduled from the first message 320.

Additionally, the UE may transmit a response message to base station 105 in response to the first message 320. For example, the UE may transmit a second message 322 (e.g., an acknowledgment message). As the UE successfully decoded the first message 320, the UE may transmit an positive acknowledgment (e.g., ACK). A second cross carrier activation indicator 372 may be included in the second message 322 (e.g., an acknowledgment message) in some implementations to acknowledge receipt and successful decode of the cross carrier activation indicator 362 of the first message 320 to the base station 105.

Although not shown in FIG. 3, the base station 105 may send multiple first message 320 in multiple CCs, as described and shown with reference to later figures. Such messages may be the same (repetitions) and may be included to improve reliability. Although, as described herein, the UE 115 only has to decode one first message 320 transmitted via one channel/CC to enable SPS on multiple channels/CC.

The base station 105 transmits third messages 340 according to the SPS CGs indicated or identified by the cross carrier activation indicator 362 of first message 320. Each third message 340 may be transmitted on its own carrier, such as channel/CC. In some implementations, the third messages 340 are identical, i.e., have the same settings and same data. In other implementations, one or more third messages of the third messages 340 may be different, e.g., have different transmission settings or different data, such as different payload data. UE 115 monitors the SPS CGs and receives the third messages 340 on multiple carriers. The UE 115 may decode the third messages 340 individually or jointly. The previously described operation corresponds to downlink SPS CGs. UE 115, in addition to or in the alternative of, may perform SPS CGs for uplink transmissions.

Thus, FIG. 3 describes single message activation or reactivation of SPS CGs between UE 115 and base station 105. Single message activation or reactivation of SPS CGs enables a network to reduce latency and overhead and improve reliability, as compared to having a message on each channel or CC activate/reactivate its own channel or CC for SPS CGs. Improving performance of such operations may improve throughput for communications on the network and enable use of mm wave frequency ranges and URLLC modes.

Figure 4:
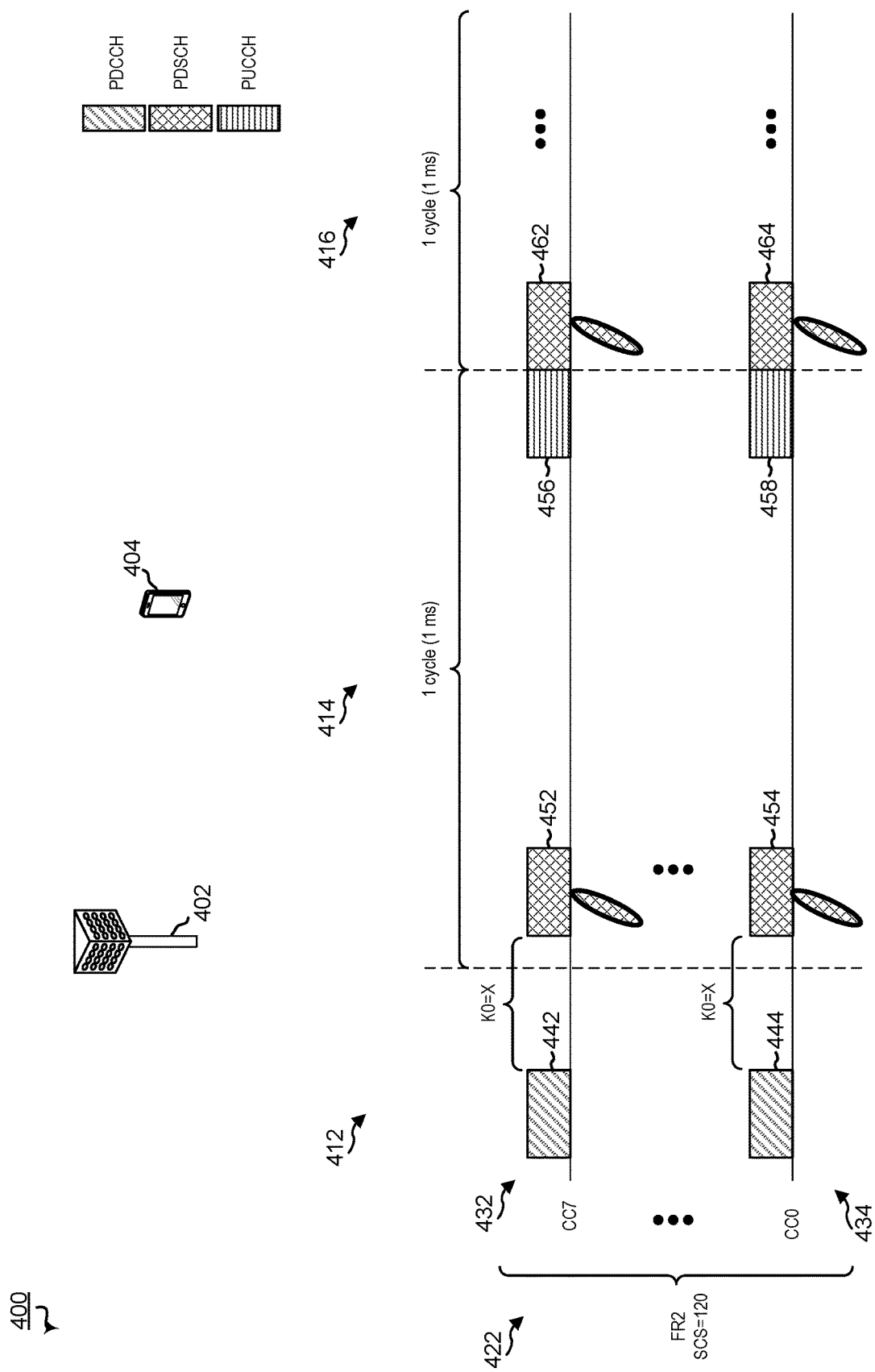
FIG. 4 is an example of a block diagram illustrating a portion of an NR network in which communications occur between a base station and UE.
Figure 5:
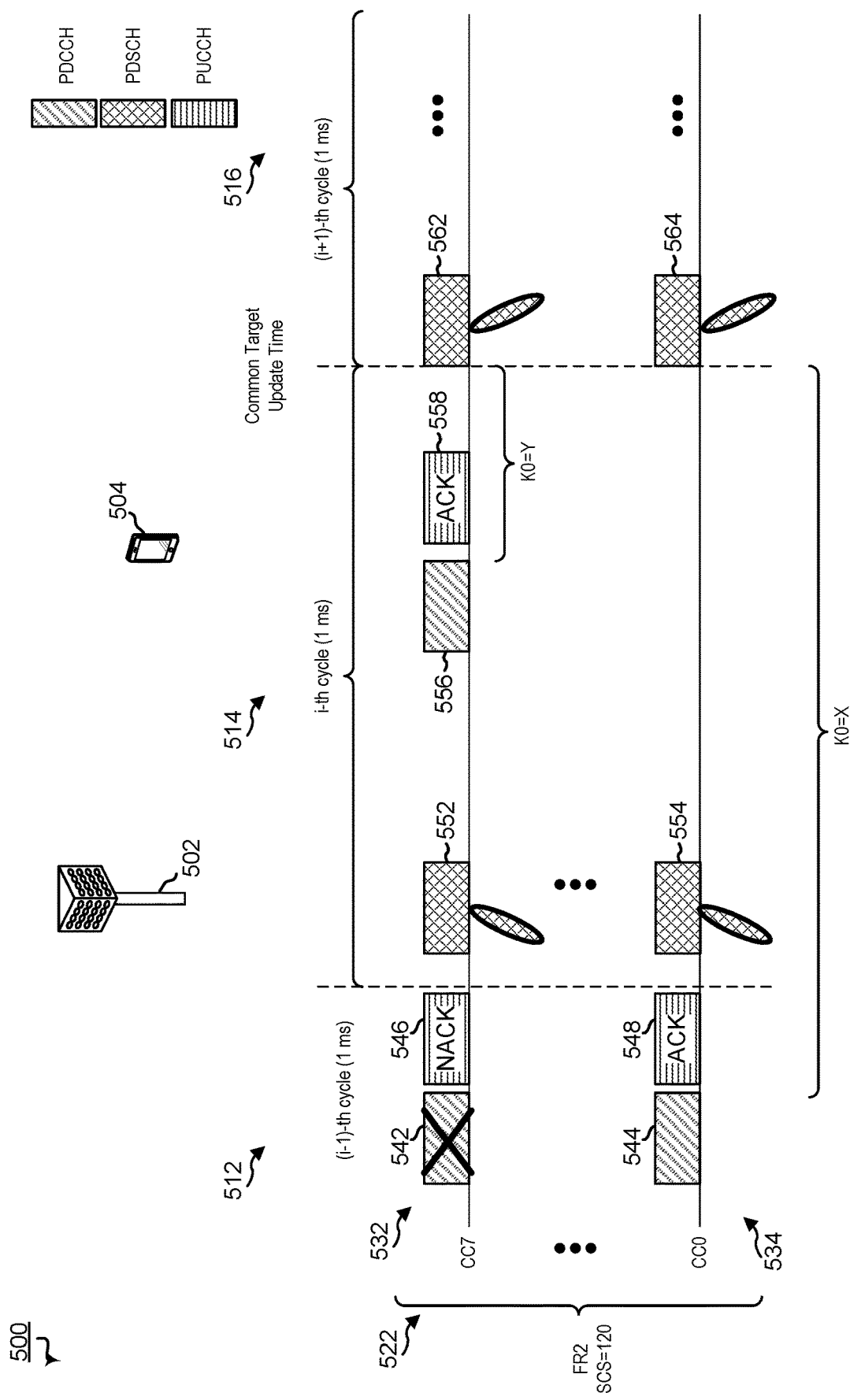
FIG. 5 is an example of a block diagram illustrating a portion of an NR network in which communications occur between a base station and UE.
Figure 6:
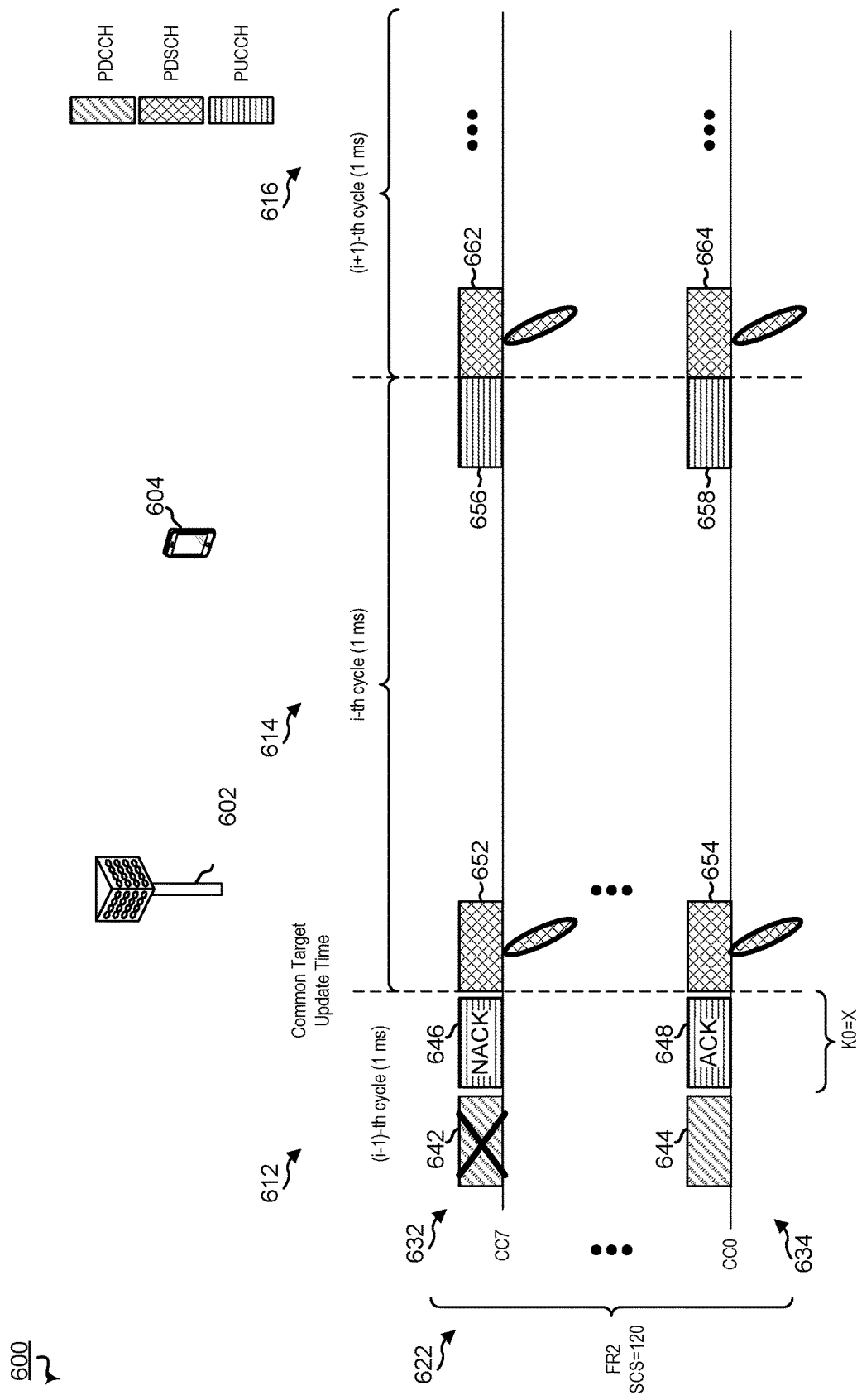
FIG. 6 is an example of a block diagram illustrating a portion of an NR network in which communications occur between a base station and UE each configured according to aspects of the present disclosure.
Figure 7:
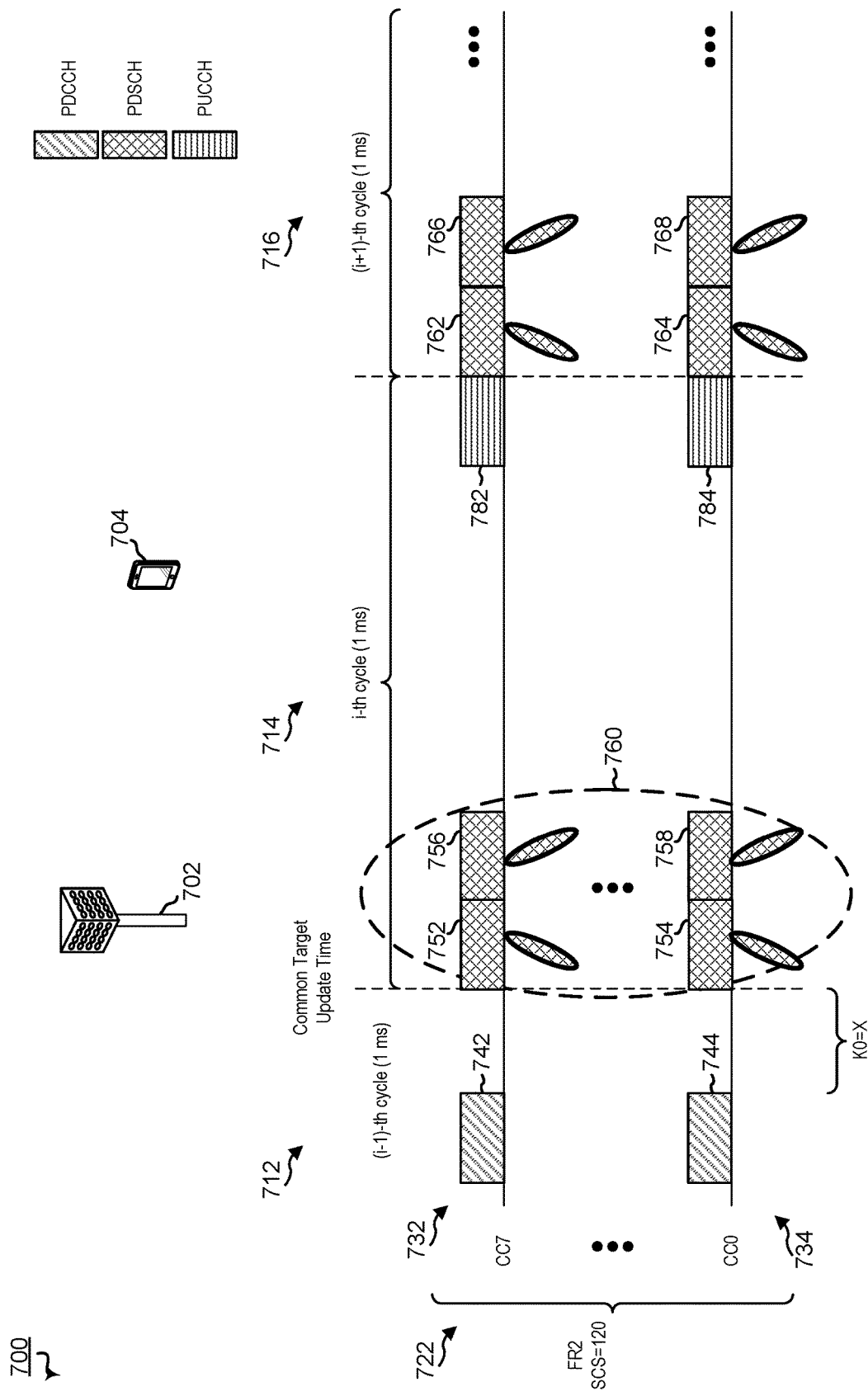
FIG. 7 is an example of a block diagram illustrating a portion of an NR network in which communications occur between a base station and UE each configured according to aspects of the present disclosure.
Figure 8:
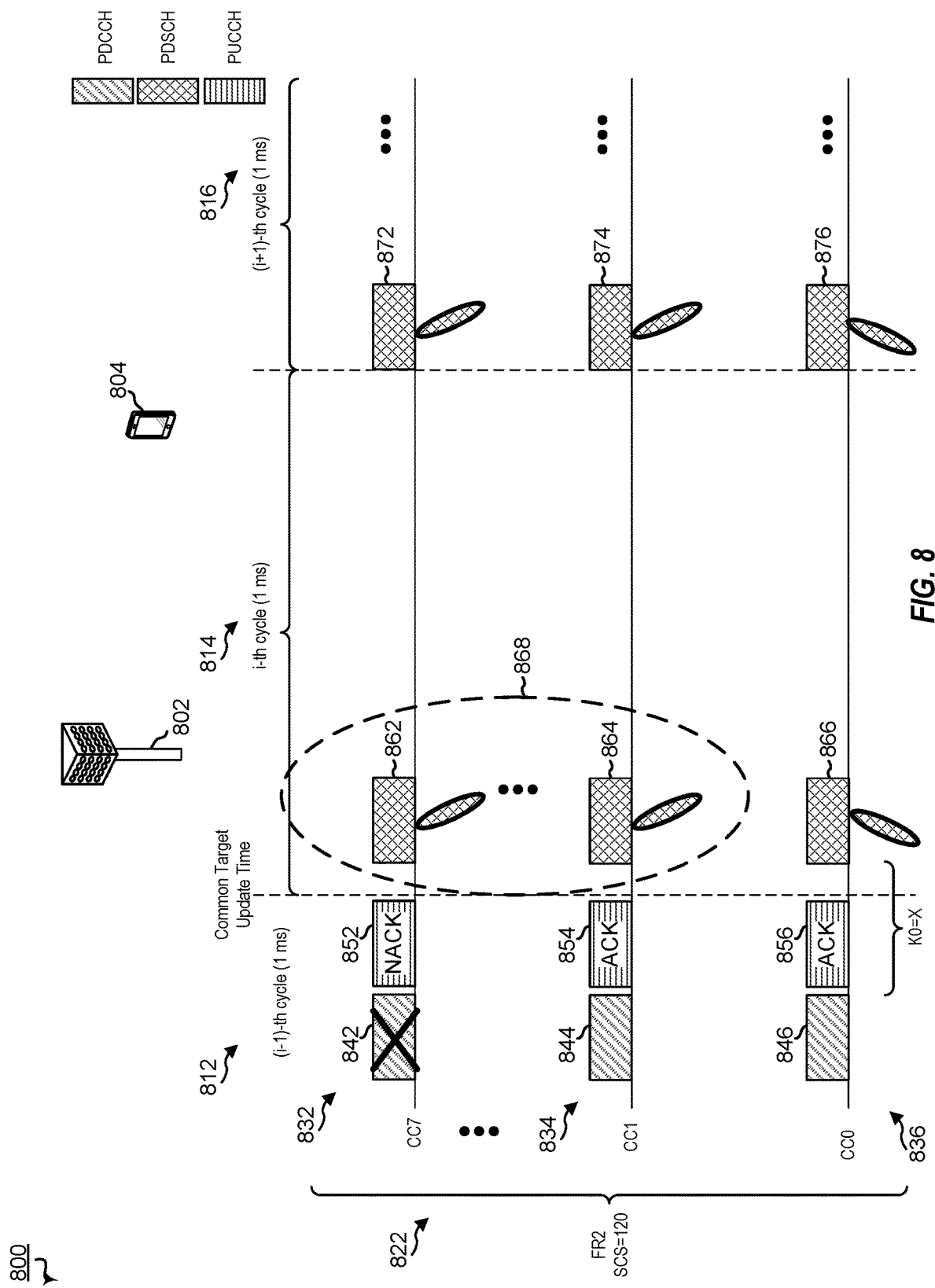
FIG. 8 is an example of a block diagram illustrating a portion of an NR network in which communications occur between a base station and UE each configured according to aspects of the present disclosure.

FIGS. 4-8 illustrate examples of SPS (e.g., a type of periodic grant). FIG. 4 illustrates an example of SPS activation per CC. FIG. 5 illustrates an example of SPS reactivation per CC. FIGS. 6-8 illustrate examples of single message periodic grant activation. FIG. 6 illustrates an example of single message SPS activation or reactivation of multiple CCs. FIG. 7 illustrates another example of single message SPS activation or reactivation of multiple CCs with beam sweep. FIG. 8 illustrates an example of single message SPS activation or reactivation of multiple CCs with two different CG configurations.

Referring to FIG. 4, FIG. 4 illustrates a timing diagram 400 illustrating communications between a base station 402 and a UE 404. Base station 402 may direct the UE 404 to activate each CC individually with its own dedicated SPS activation message. However, if an SPS activation message is not successfully received and decoded (as illustrated in FIG. 5), the transmission of data on one or more CCs will be delayed. To illustrate, short cycle times (e.g., low latency modes), signal blockage, interference, slot configuration, etc. may affect a UE's ability to decode the SPS activation message and/or provide an acknowledgment thereof in the same cycle. As an example, URLLC may operate in the mm wave frequency range, which is more prone to blockage, and may operate with low latency such that SPS message acknowledgments are generally provided in the next cycle.

Referring to timing diagram 400, multiple cycles (first cycle 412, second cycle 414, and third cycle 416) are illustrated for a single frequency range (e.g., FR1 or FR2), a frequency range 422 (e.g., first frequency range). As illustrated in FIG. 4, the frequency range 422 is FR2 and has a sub carrier spacing (SCS) of 120. Also, two component carriers (CCs) are illustrated for the frequency range 422. Specifically, the frequency range 422 has a first CC 432 (e.g., CC 7) and a second CC 434 (e.g., CC 0).

In FIG. 4, the base station 402 transmits a SPS activation message 442 (e.g., first SPS activation message) via the first CC 432 (e.g., a first carrier) and transmits a SPS activation message 444 (e.g., second SPS activation message) via the second CC 434.

The SPS activation messages 442, 444 may be acknowledged by corresponding acknowledgment messages, such as by positive ACKs in PUCCHs (not shown but similar to PUCCHs 456, 458). Based on the receipt and transmission of SPS activation messages 442, 444 (and optionally corresponding acknowledgment messages) the UE 404 and base station 402 may schedule CGs for future cycles, such as cycles 414, 416.

In the example of FIG. 4, the UE 404 and the base station 402 schedule CGs for PDSCHs in cycles 414 and 416. Specifically, the UE schedules CGs of PDSCH 452 (e.g., first PDSCH) and PDSCH 462 (e.g., third PDSCH) based on SPS activation message 442 (e.g., first SPS activation message), and the UE schedules CGs of PDSCH 454 (e.g., second PDSCH) and PDSCH 464 (e.g., fourth PDSCH) based on SPS activation message 444 (e.g., second SPS activation message). The UE 404 may transmit acknowledgment messages for the PDSCHs. As illustrated in FIG. 4, the UE 404 transmits acknowledgment messages for PDSCHs 452, 454 in corresponding PUCCHs 456, 458.

Referring to FIG. 5, FIG. 5 illustrates a timing diagram 500 illustrating communications between a base station 502 and a UE 504. Base station 502 may direct the UE 504 to activate each CC individually with its own dedicated SPS activation or reactivation message. However, if a SPS activation or reactivation message is not successfully received and decoded as illustrated in FIG. 5 and described above with reference to FIG. 4, CGs may be delayed and a common target update time may be delayed. As illustrated in FIG. 5, the SPS messages are reactivation messages and the SPS of FIG. 4 may be reactivated as depicted in FIG. 5.

Referring to timing diagram 500, multiple cycles (first cycle 512, second cycle 514, and third cycle 516) are illustrated for a single frequency range (e.g., FR1 or FR2), a frequency range 522 (e.g., first frequency range). As illustrated in FIG. 5, the frequency range 522 is FR2 and has a sub carrier spacing (SCS) of 120. Also, two component carriers (CCs) are illustrated for the frequency range 522. Specifically, the frequency range 522 has a first CC 532 (e.g., CC 7) and a second CC 534 (e.g., CC 0).

In FIG. 5, the base station 502 transmits a SPS reactivation message 542 (e.g., first SPS reactivation message) via the first CC 532 and transmits a SPS reactivation message 544 (e.g., second SPS reactivation message) via the second CC 534. In FIG. 5, the UE 504 does not successfully receive and/or decode the SPS reactivation message 542. Thus, the UE transmits a NACK 546 corresponding to SPS reactivation message 542 in the first CC 532 and a ACK 548 corresponding to SPS reactivation message 544 in the second CC 534.

Because of the failed SPS reactivation on the first CC 532, the base station transmits another SPS reactivation message 556 via the first CC 532 in the second cycle 514, which is successfully received and decoded, and acknowledged via ACK in PUCCH 558. Although PDSCHs 552 and 554 may be scheduled, if they are scheduled, they may not be useable for PDSCH cross carrier repetition.

In the example of FIG. 5, the UE 504 and the base station 502 schedule CGs for PDSCHs in both CCs for cycle 516 only. Specifically, the UE schedules a CG of PDSCH 562 (e.g., third PDSCH) based on SPS reactivation message 556 (e.g., third SPS reactivation message), and the UE schedules a CG of PDSCH 564 (e.g., fourth PDSCH) based on SPS reactivation message 544 (e.g., second SPS reactivation message). Such CGs of PDSCHs 562 and 564 may be cross carrier PDSCH repetitions. Accordingly, such repetitions of the third cycle 516 may be jointly decoded to increase throughput and reliability. The UE may transmit acknowledgment messages for the PDSCHs similar to as described with reference to FIG. 4.

Referring to FIG. 6, FIG. 6 illustrates a timing diagram 600 illustrating communications between a base station 602 and a UE 604. Base station 602 may activate or reactivate SPS CGs for the UE 604 across multiple CCs with a single SPS message. Thus, the UE can only decode one SPS message in one CC to activate or reactivate SPS CGs across multiple CCs. Accordingly, SPS CGs may be configured faster with reduced latency across multiple CCs as compared to per CC activation in FIGS. 4 and 5. In the example illustrated in FIG. 6, the UE operates in without beam sweep enabled.

Referring to timing diagram 600, multiple cycles (first cycle 612, second cycle 614, and third cycle 616) are illustrated for a single frequency range (e.g., FR1 or FR2), a frequency range 622 (e.g., first frequency range). As illustrated in FIG. 6, the frequency range 622 is FR2 and has a sub carrier spacing (SCS) of 120. Also, two component carriers (CCs) are illustrated for the frequency range 622. Specifically, the frequency range 622 has a first CC 632 (e.g., CC 7) and a second CC 634 (e.g., CC 0). Although reactivation messages are illustrated in FIG. 6, in other implementations, activation message may be transmitted.

During operation, the base station 602 transmits a SPS message 642 (e.g., first SPS activation or reactivation message) via the first CC 632 and transmits a SPS message 644 (e.g., second SPS activation or reactivation message) via the second CC 634. In FIG. 6, the UE 604 does not successfully receive and/or decode the SPS message 642. Thus, the UE 604 transmits a NACK 646 corresponding to SPS message 642 in the first CC 632 and a ACK 648 corresponding to SPS message 644 in the second CC 634. The NACK 646 and ACK 648 may be transmitted in corresponding PUCCHs, such as a UCI thereof.

In the example of FIG. 6, the UE 604 and the base station 602 schedule CGs for PDSCHs in cycles 614 and 616. Specifically, the UE 604 schedules CGs of PDSCHs 652 (e.g., first PDSCH), PDSCH 654 (e.g., second PDSCH), PDSCH 662 (e.g., third PDSCH), and PDSCH 664 (e.g., fourth PDSCH) based on SPS message 644 (e.g., second SPS message). UE 604 may determine to activate SPS CGs for multiple CCs based on a cross carrier activation indicator (e.g., 362) included in SPS message 644. As compared to FIG. 5 where one SPS message is not received, the common target update time in FIG. 6 (time to activate all SPS/CGs on multiple or all CCs) is reduced by one cycle reducing latency and improving throughput. Accordingly, PDSCH cross carrier repetition may be initiated one cycle earlier and by a single message.

The UE 604 may send acknowledgment messages for the PDSCHs scheduled by configured grant. As illustrated in FIG. 6, UE 604 transmits corresponding acknowledgment messages for PDSCHs 652, 654 via PUCCHs 656, 658.

Although two cycles of CGs are illustrated in FIG. 6, in other implementations, the UE 604 and base station 602 may continue to schedule CGs for additional cycles, such as X number of cycles. The amount of cycles may be preprogramed or reconfigurable. As illustrative, non-limiting examples, 2, 3, 4, 5, 6, 7, 10, etc., cycles may be used for X.

Referring to FIG. 7, FIG. 7 illustrates a timing diagram 700 illustrating communications between a base station 702 and a UE 704. Base station 702 may direct the UE 704 to operate with beam sweep, such as identify or provide beam sweep pattern information for CGs across multiple CCs scheduled by a single SPS message. Base station 702 may enable cross carrier activation (e.g., cross carrier repetition) with a first message and beam sweep with a second message, or may enable both cross carrier activation (e.g., cross carrier repetition) and beam sweep with a single message.

Referring to timing diagram 700, multiple cycles (first cycle 712, second cycle 714, and third cycle 716) are illustrated for a single frequency range (e.g., FR1 or FR2), a frequency range 722 (e.g., first frequency range). As illustrated in FIG. 7, the frequency range 722 is FR2 and has a sub carrier spacing (SCS) of 120. Also, two component carriers (CCs) are illustrated for the frequency range 722. Specifically, the frequency range 722 has a first CC 732 (e.g., CC 7) and a second CC 734 (e.g., CC 0). Although reactivation messages are illustrated in FIG. 7, in other implementations, activation message may be transmitted.

During operation, the base station 702 transmits a SPS message 742 (e.g., first SPS activation or reactivation message) via the first CC 732 and transmits a SPS message 744 (e.g., second SPS activation or reactivation message) via the second CC 734. In FIG. 7, the UE 704 may not successfully receive and/or decode the SPS message 742. Thus, the UE 704 transmits an ACK or a NACK corresponding to SPS message 742 in the first CC 732 and an ACK corresponding to SPS message 744, which was successfully received and/or decoded, in the second CC 734. The ACK/NACK and ACK may be transmitted in corresponding PUCCHs, such as a UCI thereof, as described with reference to FIG. 6.

In the example of FIG. 7, the UE 704 and the base station 702 schedule CGs for PDSCHs in cycles 714 and 716. Specifically, the UE 704 schedules CGs of PDSCHs 752-758 (e.g., first-fourth PDSCHs) and PDSCHs 762-768 (e.g., fifth-eighth PDSCHs) based on SPS message 744 (e.g., second SPS message). Thus, UE 704 may determine to activate SPS CGs for multiple CCs based on a cross carrier activation indicator (e.g., 362) included in SPS message 744. As compared to FIG. 5 where one SPS message is not received, the common target update time in FIG. 7 (time to activate all SPS/CGs on multiple or all CCs) is reduced by one cycle reducing latency and improving throughput.

The UE may send acknowledgment messages for the PDSCHs scheduled by SPS/configured grant. As illustrated in FIG. 7, UE 704 transmits corresponding acknowledgment messages for PDSCHs 752-758 via PUCCHs 782, 784. As shown by 760, PDSCHs 752 and 754 have the same configuration and PDSCHs 756 and 758 have the same configuration, thus, the pairs of PDSCHs may be jointly decoded in some implementations.

In another implementation, a single SPS message (e.g., 744) enables both SPS and beam sweep. For example, SPS message 742 may be not be successfully received or decoded, and SPS message 744 may indicate beam sweep in addition to cross carrier activation (e.g., cross carrier repetition). To illustrate, SPS message 744 further includes a beam sweep indicator. The beam sweep indicator may be a dedicated indicator (e.g., 372) or included in or part of the cross carrier indicator (e.g., 362) of SPS message 744.

Thus, FIG. 7 describes a beam sweep mode where the UE can determine beam sweep pattern based on a single message, e.g., the same message that indicates cross carrier activation or another single message. Accordingly, the UE and the base station can obtain the benefits of beam sweep, such as reduced latency overhead and increased throughput and reliability, with reduced overhead and signaling.

Referring to FIG. 8, FIG. 8 illustrates a timing diagram 800 illustrating communications between a base station 802 and a UE 804. Base station 802 may direct the UE 804 to operate with different characteristics in subsets of carriers of the plurality of carriers by a single SPS message. As illustrated in FIG. 8, at least one CC has a different beam sweep. Base station 802 may enable a first cross carrier activation (e.g., cross carrier repetition) with a first message and a second cross carrier activation with a second message, or may enable both cross carrier activations (e.g., cross carrier repetition) with a single message.

Referring to timing diagram 800, multiple cycles (first cycle 812, second cycle 814, and third cycle 816) are illustrated for a single frequency range (e.g., FR1 or FR2), a frequency range 822 (e.g., first frequency range). As illustrated in FIG. 8, the frequency range 822 is FR2 and has a sub carrier spacing (SCS) of 120. Also, three component carriers (CCs) are illustrated for the frequency range 822. Specifically, the frequency range 822 has a first CC 832 (e.g., CC 8), a second CC 834 (e.g., CC 1), and a third CC 836 (e.g., CC 0). Although reactivation messages are illustrated in FIG. 8, in other implementations, activation message may be transmitted.

During operation, the base station 802 transmits a SPS message 842 (e.g., first SPS activation or reactivation message) via the first CC 832, transmits a SPS message 844 (e.g., second SPS activation or reactivation message) via the second CC 834, and transmits a SPS message 846 (e.g., third SPS activation or reactivation message) via the third CC 836. In FIG. 8, the UE 804 does not successfully receive and/or decode the SPS message 842. Thus, the UE 804 transmits a NACK 852 corresponding to SPS message 842 in the first CC 832 and ACKs 854, 856 corresponding to SPS messages 844, 846 in the second CC 834 and the third CC 836 as illustrated. The NACK 852 and ACKs 854, 856 may be transmitted in corresponding PUCCHs, such as a UCI thereof.

In the example of FIG. 8, the UE 804 and the base station 802 schedule CGs for PDSCHs in cycles 814 and 816. Specifically, the UE 804 schedules CGs of PDSCHs 862 (e.g., first PDSCH), PDSCH 864 (e.g., second PDSCH), PDSCH 866 (e.g., third PDSCH), PDSCH 872 (e.g., fourth PDSCH), PDSCH 874 (e.g., fifth PDSCH), and PDSCH 876 (e.g., sixth PDSCH) based on SPS message 844 (e.g., second SPS message alone). UE 804 may determine to activate SPS CGs for multiple CCs based on a cross carrier activation indicator (e.g., 362) included in SPS message 844. As shown by 868, PDSCHs have the same configuration, thus, the may be jointly decoded in some implementations. As compared to FIG. 5 where one SPS message is not received, the common target update time in FIG. 8 (time to activate all SPS/CGs on multiple or all CCs) is reduced by one cycle reducing latency and improving throughput.

In other implementations, UE schedules CGs of PDSCHs 866 (e.g., third PDSCH), and PDSCH 876 (e.g., sixth PDSCH) based on SPS message 846 (e.g., third SPS message alone and not SPS message 844). Thus, UE 804 may schedule multiple different types of CGs across the CCs based one or more SPS messages (e.g., 844, or 844 and 846).

Although the CCs are included in a single frequency range in FIGS. 4-8, in other implementations the CCs may be included in multiple frequency ranges, such as FR1 and FR2. Additionally, or alternatively, as illustrated in FIG. 8, the CCs may be split into groups (e.g., QCL groups or groups having same QCL) in one or more frequency ranges.

Furthermore, in any of single message SPS cross carrier activation examples of FIGS. 6-8, the UE can still operate in a per channel activation mode for one or more channels, as in FIGS. 4 and 5. For example, the UE can still activate one or more carriers (e.g., CCs) individually, such as dedicated control carriers, uplink carriers, downlink carriers, etc., as illustrative, non-limiting examples. Accordingly, the cross carrier activation operations described herein offer more flexibility with reduced overhead and enable cross carrier repetition and beam sweep to be activated more quickly, such as for short cycle durations, which may be present in 5G and/or URLLC modes.

Figure 11:
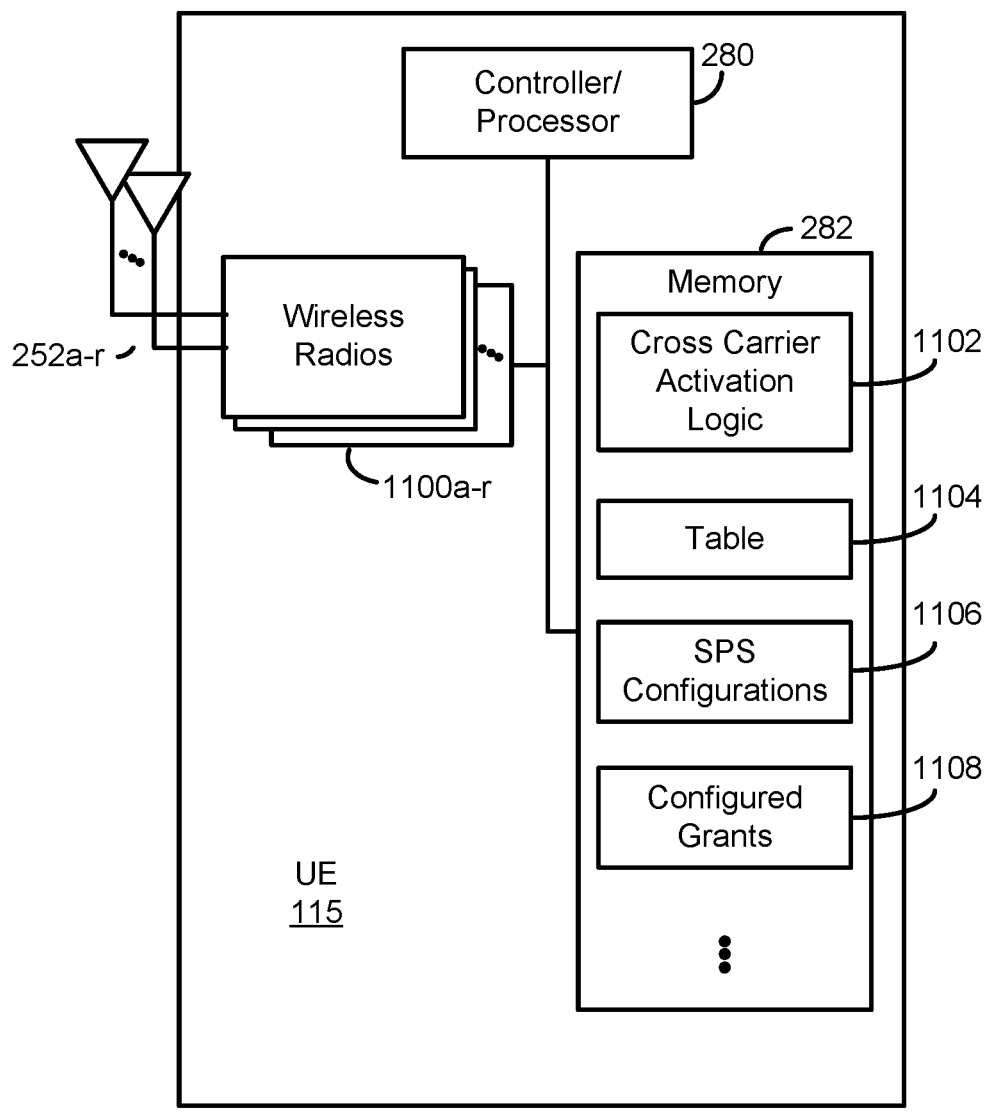
FIG. 11 is a block diagram conceptually illustrating a design of a UE according to some embodiments of the present disclosure.

FIG. 9 is a block diagram illustrating example blocks executed by a UE configured according to an aspect of the present disclosure. The example blocks will also be described with respect to UE 115 as illustrated in FIG. 11. FIG. 11 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1100a-r and antennas 252a-r. Wireless radios 1100a-r includes various components and hardware, as illustrated in FIG. 2 for UE 115, including modulator/demodulators 254a-r, MIMO detector 256, receive processor 258, transmit processor 264, and TX MIMO processor 266.

At block 900, a mobile communication device, such as a UE receives, during a first cycle, a periodic grant via a first carrier of a plurality of carriers. A UE, such as UE 115, may execute, under control of controller/processor 280, cross carrier activation logic 1102, stored in memory 282. The execution environment of cross carrier activation logic 1102 provides the functionality for UE 115 to define and perform the cross carrier activation procedures. The execution environment of cross carrier activation logic 1102 defines the different cross carrier activation processes, such as determining SPS configurations (e.g., 308) configured grant scheduling (e.g., 352, 354) using one or more of 1104-1108, as described with reference to block 901. UE 115 receives the periodic grant (e.g., a downlink message) via antennas 252a-r and wireless radios 1100a-r. UE may send an acknowledgement message responsive to the periodic grant to indicate successful reception and decoding of the periodic grant.

At block 901, the UE monitors, during a next cycle after the first cycle, for configured grants (CGs) for multiple carriers of the plurality of carriers based on the periodic grant, during monitoring, one or more channel measurements for a set of candidate CCs of the plurality of CCs. The execution environment of cross carrier activation logic 1102 provides UE 115 the functionalities described with respect to the various aspects of the present disclosure, such as determining SPS configurations (e.g., 308) configured grant scheduling (e.g., 352, 354) using one or more of 1104-1108. To illustrate, within the execution environment of cross carrier activation logic 1102, UE 115, under control of controller/processor 280, may determine one or more SPS configurations for CGs based on table 1104. As an illustrative example, table 1104 is a mapping table which maps information indicated by a cross carrier indicator (e.g., 362) to one or more SPS configurations for CGs of the possible SPS configurations 1106 and CGs 1108.

At block 902, the UE receives, during the next cycle after the first cycle, a first transmission in a first CG of the CGs via a second carrier of the plurality of carriers and a second transmission in a second CG of the CGs via a third carrier of the plurality of carriers. Once UE 115 determines the schedule of CGs and SPS configuration at block 901, UE 115 may monitor the CGs and receive transmissions corresponding to the CGs scheduled by the single periodic grant message via wireless radios 1100a-r and antennas 252a-r.

The UE 115 may execute additional blocks (or the UE 115 may be configured further perform additional operations) in other implementations. For example, the UE 115 may perform one or more operations described above. As another example, the UE 115 may perform and/or operate according to one or more aspects as described below.

In a first aspect: the mobile communication device comprises a user equipment (UE);
the periodic grant comprises a Semi-Persistent Scheduling (SPS) message; the first transmission and the second transmission each comprise a Physical Downlink Shared Channel (PDSCH); the plurality of carriers correspond to a plurality of component carriers (CCs); the first carrier corresponds to a first CC of the plurality of CCs; the second carrier corresponds to a second CC of the plurality of CCs; and the third carrier corresponds to a third CC of the plurality of CCs.

In a second aspect, alone or in combination with one or more of the above aspects, prior to monitoring, the UE 115 schedules the CGs of the PDSCHs for each CC of the plurality of CCs for one or more subsequent cycles based on the SPS message.

In a third aspect, alone or in combination with one or more of the above aspects, the SPS message includes a cross carrier activation indicator, and wherein the cross carrier activation indicator is configured to indicate the CGs of the PDSCHs for each CC of the plurality of CCs.

In a fourth aspect, alone or in combination with one or more of the above aspects, the cross carrier activation indicator is a single bit.

In a fifth aspect, alone or in combination with one or more of the above aspects, the SPS message is an SPS reactivation message.

In a sixth aspect, alone or in combination with one or more of the above aspects, prior to the first cycle: the UE 115 receives, during a previous cycle, a second SPS message via the first CC of the plurality of CCs, wherein the second SPS message is an SPS activation message, and the UE 115 monitors, during the previous cycle, second CGs of corresponding second PDSCHs for each CC of the plurality of CCs based on the second SPS message.

In a seventh aspect, alone or in combination with one or more of the above aspects, prior to the first cycle: the UE 115 receives, during a previous cycle, a second SPS message via the second CC of the plurality of CCs and a third SPS message via the third CC of the plurality of CCs, where the second SPS message and the third SPS message are activation messages, and the UE 115 monitors, during the previous cycle, a second CG of a second corresponding PDSCH for the second CC of the plurality of CC based on the second SPS message and a third CG of a third corresponding PDSCH for the third CC of the plurality of CCs based on the third SPS message.

In an eighth aspect, alone or in combination with one or more of the above aspects, prior to receiving the first transmission, the UE 115 transmits a message indicating that the UE is configured for cross carrier activation via a single SPS message.

In a ninth aspect, alone or in combination with one or more of the above aspects, the UE 115 transmits an acknowledgment message corresponding to the SPS message via the first CC during the first cycle.

In a tenth aspect, alone or in combination with one or more of the above aspects, the acknowledgment message for the SPS message includes a second cross carrier activation indicator, and the second cross carrier activation indicator is configured to indicate to a base station that the UE has activated CGs on the plurality of CCs.

In an eleventh aspect, alone or in combination with one or more of the above aspects, the second cross carrier activation indicator is a single bit.

In a twelfth aspect, alone or in combination with one or more of the above aspects, a second SPS message transmitted via a second CC during the first cycle is not successfully decoding by the UE.

In a thirteenth aspect, alone or in combination with one or more of the above aspects, the UE 115 transmits a negative acknowledgment message (NACK) corresponding to the second SPS message via the second CC during the first cycle.

In another aspect, a method of wireless communication includes: receiving, by a user equipment (UE) during a first cycle, SPS message (e.g., DCI during a first Physical Downlink Control Channel (PDCCH)) via a first component carrier (CC) of a plurality of CCs; monitoring, by the UE during a next cycle after the first cycle, for configured grants (CGs) of Physical Downlink Shared Channels (PDSCHs) for each CC of the plurality of CC based on the SPS message; and receiving, by the UE during the next cycle after the first cycle, a first PDSCH transmission in a corresponding first PDSCH via a second CC of the plurality of CCs and a second PDSCH transmission in a corresponding second PDSCH via a third CC of the plurality of CCs.

Accordingly, the UE and base station may activate or reactivate cross carrier periodic grants (e.g., SPS CGs) via a single message on one carrier. Thus, latency and overhead are reduced and throughput and reliability are increased.

Figure 12:
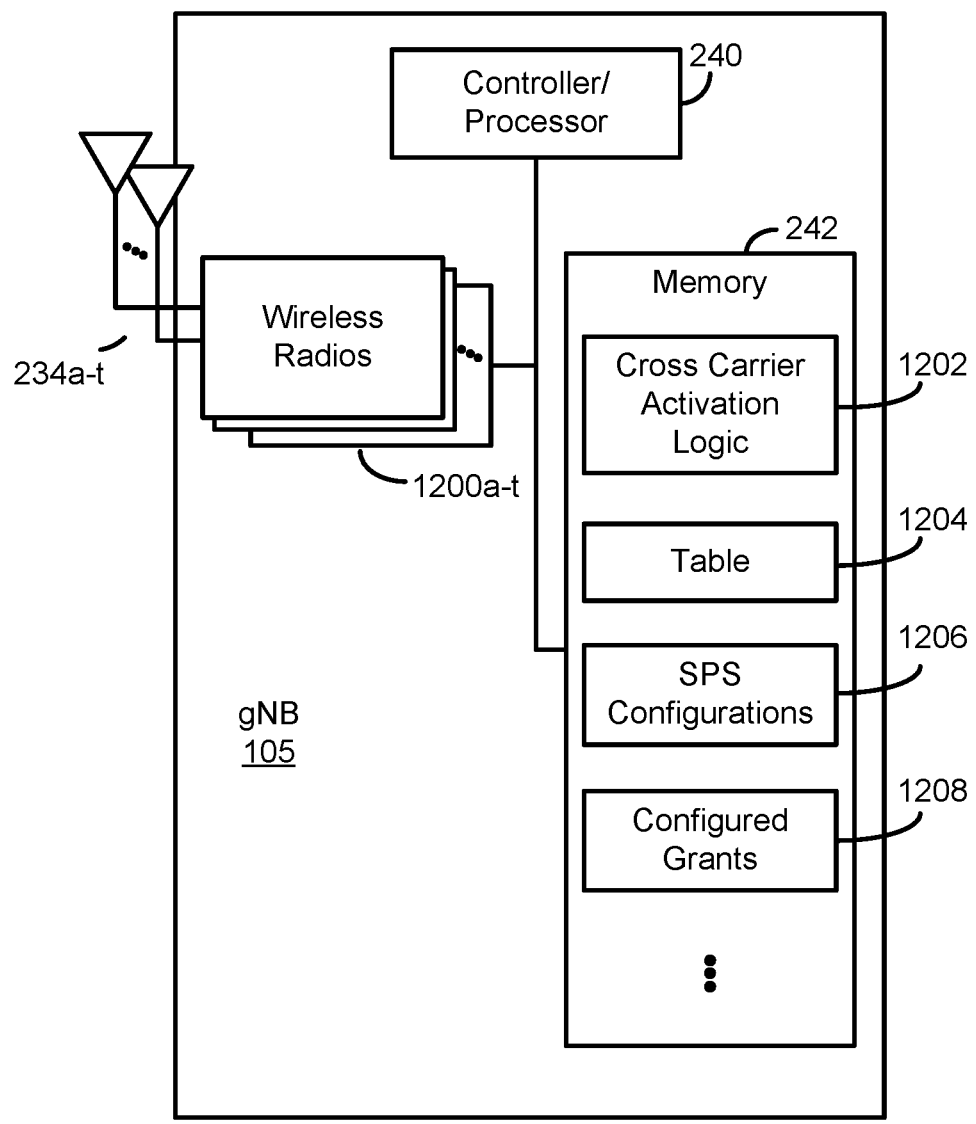
FIG. 12 is a block diagram conceptually illustrating a design of a base station configured according to some embodiments of the present disclosure.

FIG. 10 is a block diagram illustrating example blocks executed by a base station configured according to an aspect of the present disclosure. The example blocks will also be described with respect to gNB 105 (or eNB) as illustrated in FIG. 12. FIG. 12 is a block diagram illustrating gNB 105 configured according to one aspect of the present disclosure. The gNB 105 includes the structure, hardware, and components as illustrated for gNB 105 of FIG. 2. For example, gNB 105 includes controller/processor 240, which operates to execute logic or computer instructions stored in memory 242, as well as controlling the components of gNB 105 that provide the features and functionality of gNB 105. The gNB 105, under control of controller/processor 240, transmits and receives signals via wireless radios 1200*a-t* and antennas 234*a-r*. Wireless radios 1200*a-t* includes various components and hardware, as illustrated in FIG. 2 for gNB 105, including modulator/demodulators 232*a-t*, MIMO detector 236, receive processor 238, transmit processor 220, and TX MIMO processor 230.

At block 1000, a mobile communication device, such as a gNB, transmits, during a first cycle, a periodic grant via a first carrier of a plurality of carriers, the periodic grant configured to activate configured grants (CGs) on multiple carriers of the plurality of carriers. A gNB, such as gNB 105, may execute, under control of controller/processor 240, cross carrier activation logic 1202, stored in memory 242. The execution environment of cross carrier activation logic 1202 provides the functionality for gNB 105 to define and perform the cross carrier activation procedures. The data 1202-1212 in memory 242 may include or correspond to the data 1102-1112 in memory 282, respectively.

The execution environment of cross carrier activation logic 1102 defines the different cross carrier activation processes, such as in signaling activation of cross carrier activation As gNB 105 generates and transmits the periodic grant (e.g., a downlink message) via antennas 234*a-t* and wireless radios 1200*a-t*. Within the execution environment of the cross carrier activation logic 1102, gNB 105, under control of controller/processor 240, encodes the periodic grant for transmission via a selected physical channel.

At block 1001, the gNB receives, during the first cycle, a first acknowledgment message corresponding to the periodic grant, the first acknowledgment message indicating receipt of the periodic grant. The execution environment of cross carrier activation logic 1102 provides the functionality for gNB 105 to define and perform the cross carrier activation procedures. The gNB 105 may receive the uplink transmission, the first acknowledgement message including feedback (e.g., ACK or NACK), for or corresponding the first transmission via wireless radios 1200*a-t* and antennas 234*a-t*. Based on the gNB 105 determining that the first acknowledgment message included an ACK or indicator that the message was received and decoded, the gNB may schedule cross carrier activation of the periodic grant.

At block 1002, the gNB transmits, during a next cycle after the first cycle, a first transmission in a corresponding first CG via a second CC of the plurality of carriers and a second transmission in a corresponding second CG via a third carrier of the plurality of carriers. The execution environment of the cross carrier activation logic 1102 provides gNB 105 the functionalities described with respect to the various aspects of the present disclosure. The gNB 105 may transmit the downlink transmissions for the CGs via multiple carriers, e.g., other carriers in addition to the carrier where the periodic grant was sent and/or the carrier where the first acknowledgment message was received.

The base station 105 may execute additional blocks (or the base station 105 may be configured further perform additional operations) in other implementations. For example, the base station 105 may perform one or more operations described above. As another example, the UE 115 may perform and/or operate according to one or more aspects as described below.

In a first aspect: the mobile communication device comprises a base station; the periodic grant comprises a Semi-Persistent Scheduling (SPS) message; the first transmission and the second transmission each comprise a Physical Downlink Shared Channel (PDSCH); the plurality of carriers correspond to a plurality of component carriers (CCs); the first carrier corresponds to a first CC of the plurality of CCs; the second carrier corresponds to a second CC of the plurality of CCs; and the third carrier corresponds to a third CC of the plurality of CCs.

In a second aspect, alone or in combination with one or more of the above aspects, prior to transmitting, the base station 105 schedules CGs of the PDSCHs for each CC of the plurality of CCs for one or more subsequent cycles based on the first acknowledgment message.

In a third aspect, alone or in combination with one or more of the above aspects, the SPS message includes a cross carrier activation indicator, and wherein the cross carrier activation indicator is configured to indicate the CGs of the PDSCHs for each CC of the plurality of CCs.

In a fourth aspect, alone or in combination with one or more of the above aspects, each CC of the plurality of CCs has the same configuration for the CGs.

In a fifth aspect, alone or in combination with one or more of the above aspects, the base station 105 is configured to operate on multiple CCs of a frequency range that includes the plurality of CCs and a second plurality of CCs, wherein the SPS message does not indicate to activate CGs of PDSCHs for second CCs of the second plurality of CCs.

In a sixth aspect, alone or in combination with one or more of the above aspects, each CC of the plurality of CCs has the same configuration for the CGs.

In a seventh aspect, alone or in combination with one or more of the above aspects, each PDSCH scheduled by the SPS message has the same beam pattern when beam sweep is not enabled for each CG.

In an eighth aspect, alone or in combination with one or more of the above aspects, the SPS message enables beam sweep for the CGs of the PDSCHs.

In a ninth aspect, alone or in combination with one or more of the above aspects, the SPS message schedules two CGs of PDSCHs per cycle per CC.

In a tenth aspect, alone or in combination with one or more of the above aspects, each of the two CGs includes different data.

In an eleventh aspect, alone or in combination with one or more of the above aspects, the base station 105 receives an acknowledgment message for each PDSCH received by a receiving device.

In another aspect, a method of wireless communication includes: transmitting, by a base station during a first cycle, one or more SPS messages, the one or more SPS messages including a first SPS message transmitted via a first component carrier (CC) of a plurality of CCs, the first SPS message configured to activate configured grants (CGs) of Physical Downlink Shared Channels (PDSCHs) on multiple CCs of the plurality of CCs; receiving, by the base station during the first cycle, a first acknowledgment message corresponding to the first SPS message, the first acknowledgment message indicating receipt of the first SPS message; and transmitting, by the base station during a next cycle after the first cycle, a first PDSCH transmission in a corresponding first PDSCH via a second CC of the plurality of CCs and a second PDSCH transmission in a corresponding second PDSCH via a third CC of the plurality of CCs.

Accordingly, the UE and gNB may activate or reactivate cross carrier periodic grants (e.g., SPS CGs) via a single message on one carrier. Thus, latency and overhead are reduced and throughput and reliability are increased.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps (e.g., the logical blocks in FIGS. 9 and 10) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus configured for wireless communication, the apparatus comprising at least one processor and a memory coupled to the at least one processor, wherein the at least one processor is configured to cause the apparatus to:
   receive, during a first cycle, a periodic grant via a first carrier of a plurality of carriers;
   monitor, during a next cycle after the first cycle, for configured grants (CGs) for multiple carriers of the plurality of carriers based on the periodic grant; and receive, during the next cycle after the first cycle, a first transmission in a first CG of the CGs via a second carrier of the plurality of carriers and a second transmission in a second CG of the CGs via a third carrier of the plurality of carriers, wherein:

the apparatus comprises a user equipment (UE);

the periodic grant comprises a Semi-Persistent Scheduling (SPS) message;

the first transmission and the second transmission each comprise a Physical Downlink Shared Channel (PDSCH);

the plurality of carriers correspond to a plurality of component carriers (CCs);

the first carrier corresponds to a first CC of the plurality of CCs;

the second carrier corresponds to a second CC of the plurality of CCs;

the third carrier corresponds to a third CC of the plurality of CCs;

the periodic grant enables beam sweep for transmissions corresponding to the CGs activated by the periodic grant; and each transmission of the transmissions has a different beam pattern from an adjacent transmission on a same carrier and during a same cycle when beam sweep is enabled.

2. The apparatus of claim 1, wherein the at least one processor is configured to cause the apparatus to:
schedule, by the UE, the CGs of the PDSCHs for each CC of the plurality of CCs for one or more subsequent cycles based on the SPS message.

3. The apparatus of claim 1, wherein the SPS message includes a cross carrier activation indicator, and wherein the cross carrier activation indicator is configured to indicate the CGs of the PDSCHs for each CC of the plurality of CCs.

4. The apparatus of claim 3, wherein the cross carrier activation indicator is a single bit.

5. The apparatus of claim 1, wherein the SPS message is an SPS reactivation message, and wherein the at least one processor is configured to cause the apparatus to:
receive, during a previous cycle prior to the first cycle, a second SPS message via the first CC of the plurality of CCs, wherein the second SPS message is an SPS activation message; and
monitor, during the previous cycle, second CGs of corresponding second PDSCHs for each CC of the plurality of CCs based on the second SPS message.

6. The apparatus of claim 1, wherein the SPS message is an SPS reactivation message, and wherein the at least one processor is configured to cause the apparatus to:
receive, during a previous cycle prior to the first cycle, a second SPS message via the second CC of the plurality of CCs and a third SPS message via the third CC of the plurality of CCs, wherein the second SPS message and the third SPS message are activation messages; and
monitor, during the previous cycle, a second CG of a second corresponding PDSCH for the second CC of the plurality of CCs based on the second SPS message and a third CG of a third corresponding PDSCH for the third CC of the plurality of CCs based on the third SPS message.

7. The apparatus of claim 1, wherein the at least one processor is configured to cause the apparatus to:
transmit, prior to receipt of the first transmission, a message indicating that the apparatus is configured for cross carrier activation via a single SPS message.

8. An apparatus configured for wireless communication, the apparatus comprising at least one processor and a memory coupled to the at least one processor, wherein the at least one processor is configured to cause the apparatus to:
receive, during a first cycle, a periodic grant via a first carrier of a plurality of carriers;
monitor, during a next cycle after the first cycle, for configured grants (CGs) for multiple carriers of the plurality of carriers based on the periodic grant; and
receive, during the next cycle after the first cycle, a first transmission in a first CG of the CGs via a second carrier of the plurality of carriers and a second transmission in a second CG of the CGs via a third carrier of the plurality of carriers, wherein:
the apparatus comprises a user equipment (UE);
the periodic grant comprises a Semi-Persistent Scheduling (SPS) message;
the first transmission and the second transmission each comprise a Physical Downlink Shared Channel (PDSCH);
the plurality of carriers correspond to a plurality of component carriers (CCs);
the first carrier corresponds to a first CC of the plurality of CCs;
the second carrier corresponds to a second CC of the plurality of CCs;
the third carrier corresponds to a third CC of the plurality of CCs; and
the at least one processor is further configured to cause the apparatus to transmit an acknowledgment message corresponding to the SPS message via the first CC during the first cycle, wherein the acknowledgment message for the SPS message includes a second cross carrier activation indicator, and wherein the second cross carrier activation indicator is configured to indicate to a base station that the UE has activated CGs on the plurality of CCs.

9. The apparatus of claim 8, wherein a second SPS message transmitted via a second CC during the first cycle is not successfully decoded by the UE, and wherein the at least one processor is further configured to cause the apparatus to:
transmit a negative acknowledgment message (NACK) corresponding to the second SPS message via the second CC during the first cycle.

10. The apparatus of claim 1, wherein each CC of the plurality of CCs has the same configuration for the CGs.

11. The apparatus of claim 10, wherein the SPS message schedules two CGs of PDSCHs per CC, per cycle.

12. The apparatus of claim 11, wherein a first PDSCH corresponding to a first CG of the two CGs includes different data from a second PDSCH corresponding to a second CG of the two CGs.

13. An apparatus configured for wireless communication, the apparatus comprising at least one processor and a memory coupled to the at least one processor, wherein the at least one processor is configured to cause the apparatus to:
receive, during a first cycle, a periodic grant via a first carrier of a plurality of carriers;
monitor, during a next cycle after the first cycle, for configured grants (CGs) for multiple carriers of the plurality of carriers based on the periodic grant; and
receive, during the next cycle after the first cycle, a first transmission in a first CG of the CGs via a second carrier of the plurality of carriers and a second transmission in a second CG of the CGs via a third carrier of the plurality of carriers, wherein the at least one processor is configured to cause the apparatus to:
monitor, during a subsequent cycle after the next cycle, for the CGs for the multiple carriers of the plurality of carriers based on the periodic grant; and
receive, during the subsequent cycle, a third transmission in a third CG of the CGs via the second carrier of the plurality of carriers and a fourth transmission in a fourth CG of the CGs via the third carrier of the plurality of carriers.

* * * * *